E. W. COMFORT.
THERMOSTATIC REGULATING DEVICE.
APPLICATION FILED JUNE 9, 1914.
1,122,077.
Patented Dec. 22, 1914.
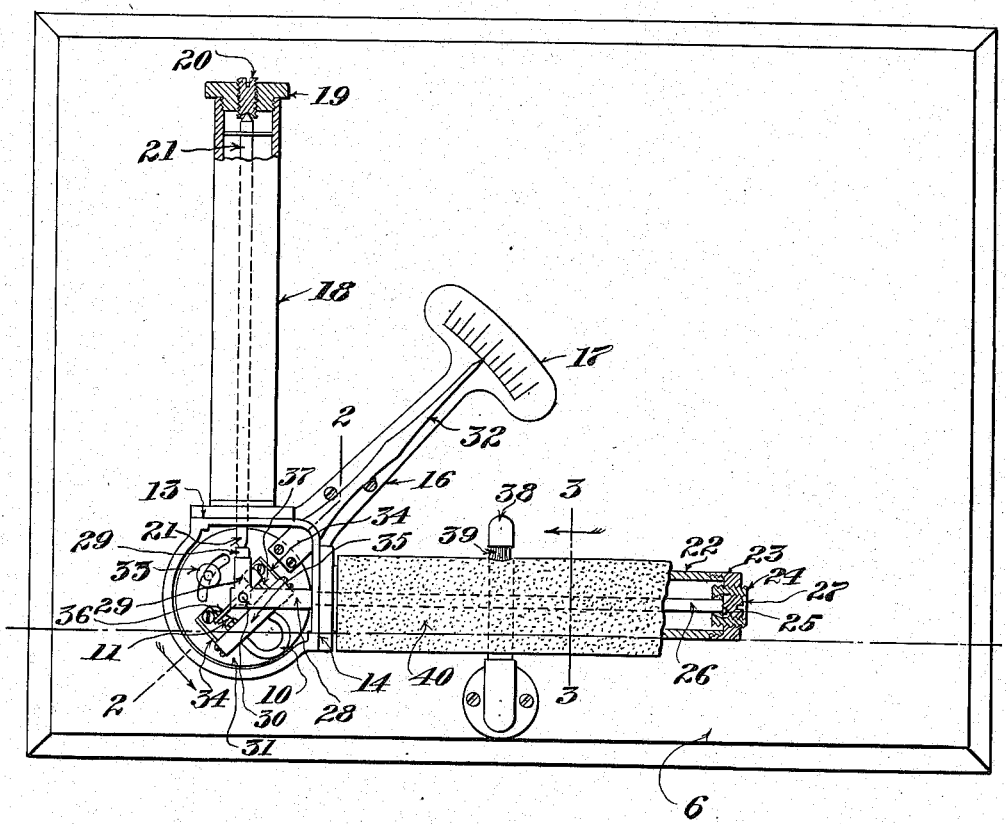
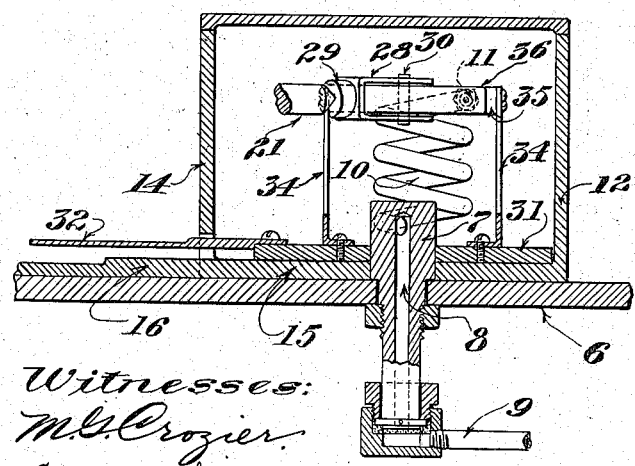
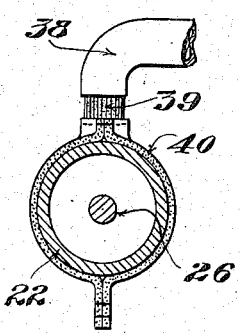
Witnesses:
M. G. Crozier.
E. C. Murphy.
Inventor:
Edward W. Comfort.
By Henry J. Miller atty.

UNITED STATES PATENT OFFICE.

EDWARD W. COMFORT, OF WINCHESTER, MASSACHUSETTS, ASSIGNOR TO AMERICAN MOISTENING COMPANY, A CORPORATION OF MAINE.

THERMOSTATIC REGULATING DEVICE.

1,122,077.  Specification of Letters Patent.  Patented Dec. 22, 1914.

Application filed June 9, 1914. Serial No. 843,995.

*To all whom it may concern:*

Be it known that I, EDWARD W. COMFORT, a citizen of the United States, residing at Winchester, in the county of Middlesex and State of Massachusetts, have invented certain new and useful Improvements in Thermostatic Regulating Devices, of which the following is a specification, reference being had to the accompanying drawings, forming part thereof.

This invention has reference to improvements in thermostatic regulating devices of the nature referred to in U. S. Letters Patent No. 1,032,189, dated July 9, 1912.

One of the objects of the present invention is to so construct thermostatic regulating devices of this nature that the expansion and contraction of the thermostatic elements will not be affected by the base or support on which the regulating device, as a whole, is mounted.

Another object of the invention is to simplify the construction of thermostatic regulating devices of this general nature.

Other objects of the invention will appear from the following description.

The invention consists in the manner of mounting the thermostatic members and in the means for transmitting the results of their expansion or contraction to the valve mechanism.

The invention also consists in such other novel features of construction and combination of parts as shall hereinafter be more fully described and pointed out in the claims.

Figure 1, represents a view in elevation of the improved regulating device, parts of the same being broken away to more clearly show the construction. Fig. 2, represents an enlarged sectional view taken on line 2—2 Fig. 1, looking in the direction indicated by the arrow of said line, with the cover in place on the casing. Fig. 3, represents a sectional view taken on line 3—3 of the web bulb thermostatic element and the means for supplying moisture.

Similar characters of reference designate corresponding parts throughout.

While the thermostatic regulating device described in the above mentioned patent operates in a satisfactory manner under ordinary conditions I find that, owing to the fact that the outer ends of the thermostatic elements are connected with members mounted on the base 5 of said patent, under some abnormal conditions the expansion, contraction or warping of said base may affect, in some slight degree, the sensitive action of the thermostatic elements. Although the effect referred to does not affect the utility or operativeness of the device when the base 5 is of suitable material and construction I prefer to provide for contingencies of use by so constructing the device that said thermostatic elements are so sustained that they cannot be affected by or through abnormal action of the base and my object is also to improve the device in other respects.

As shown in the drawings base 6 has the stud 7 having the passage 8 which connects at one end with the pipe 9 of a pressure pipe system in which it is desired to control the flow of fluid for any purpose and at the other end with the coiled and somewhat flexible tube 10 having the mouth or outlet 11.

Casing 12 has the angularly disposed walls 13 and 14 and the back 15 which latter has a perforation, to receive the stud 7, and the arm 16 having the scale member 17 and screwed to the base or back 6. Mounted on the casing wall 13 is the tubular dry bulb thermostatic member 18 having the end screw cap 19 provided with the adjustable bearing screw 20 against which one end of rod 21 bears. Similarly mounted in casing wall 14 is the tubular wet bulb thermostatic member 22 having the end screw cap 23 provided with the screw bearing 24 in which the enlarged end 25 of the rod 26 is engaged while relative longitudinal movement of said rod 26 in said bearing 24 is prevented by the screw 27 of said bearing 24. The inner ends of rods 21 and 26 extend within casing 12 and the inner end of rod 26 has the rigid frame member 28 having the right angular extension 29, against which rod 21 bears, and the pin 30.

Mounted to swing on stud 7, within casing 12, is the regulator plate 31 having the pointer 32 operating through an opening at the juncture of walls 13 and 14 and having its end related to the graduations of scale member 17. When adjusted to position this plate 31 may be secured by the thumb nut 33. On this plate 31 is mounted a frame having the resilient standards 34, 34 carrying the rigid member 35 which is free to move between the arms of frame 28 and to this member 35 is rigidly connected the outlet or end 11 of the pressure pipe 10 which is controlled by the flat spring valve 36 which is mounted on the stud 37 extending from said member 35 and is in operative engagement with pin 30 of frame member 28.

Humidity is supplied to wet bulb thermostatic member 22 through spout 38 and wick 39 and such humidity is maintained around said thermostatic member by the textile envelop 40. The delivery of water downward to said envelop 40 tends to wash dust and foreign matter from said envelop.

As recited in the above mentioned patent, the purpose of this device is to regulate a supply of moisture to the atmosphere by or through the operation of thermostatic elements influenced respectively by the temperature and humidity of the surrounding atmosphere. In the present device however the thermostatic elements are sustained wholly at their inner ends and variation in the length of either of said members 18 or 22 is transmitted through its contained rod 21 or 26 to effect operation of valve 36.

By swinging plate 31 on stud 7 to various positions indicated by means of its pointer 32 relative to the graduations of scale member 17 the valve mechanism may be adjusted relative to the angle of extension of the thermostatic elements 18 and 22 and adjustment of the device is thus effected to maintain the desired humidity.

When the temperature rises unduly the element 18 will expand and thus relieve the pressure of its rod 21 or valve 36 whereupon said valve may move in the opening direction to permit the flow of the pressure medium from the outlet 10. If, now, the humidity of the atmosphere rises above the normal or above the point at which the device is set, the evaporation of moisture from the envelop 40 of element 22 will decrease and a relative increase in the temperature of element 22 will result whereupon said element 22 will expand and will act through its rod 26, frame 28, and pin 30 on said valve 36 to draw said valve toward the outlet 11. When the movement of valve 36 is resisted by element 18 and rod 21 the action of rod 26 effects the slight movement of the member 35 which movement is permitted by the yielding of its standards 34, 34 and in each movement the mouth piece 11 may diverge somewhat from the valve 36 so that a separation is effected between valve 36 and outlet 11 to permit the pressure medium to escape.

As the thermostatic elements 18 and 22 are sustained solely by the wall members 13 and 14 of the casing 12 it is evident that the action of said elements cannot be influenced by the expansion, contraction or warping of the base or support 6.

Having thus described my invention I claim as new and desire to secure by Letters Patent.

1. A thermostatic regulating device comprising angularly extending supports, a pair of thermostatic elements having their ends mounted and sustained solely on said supports, a device for controlling a source of energy, and means adapted to be operated by expansion and contraction of said elements for actuating said controlling device.

2. A thermostatic regulating device comprising rigid angularly extending supports, a pair of thermostatic elements mounted on said supports, a member adjustably mounted with respect to such supports, a device for controlling a source of energy mounted on said adjustable member, and means adapted to be operated by said thermostatic elements for actuating said controlling device.

3. A thermostatic regulating device comprising a pair of thermostatic elements, an angular member adapted to be operated by the expansion or contraction of said elements, and a device for controlling a source of energy, said device having a valve operatively connected with said angular member.

4. A thermostatic regulating device comprising a casing having angularly disposed walls, a pair of thermostatic elements mounted on said walls, a device for controlling a source of energy mounted in said casing, and a pair of coöperating actuating members for said controlling device in operative relation to said respective thermostatic elements.

5. A thermostatic regulating device comprising a casing having angularly disposed walls and an opening, a plate adjustably mounted in said casing and having an indicator member extending through said opening, a device for controlling a source of energy mounted on said plate and having a valve, and a pair of coöperating rods adapted to be operated by the expansion or contraction of said thermostatic elements to actuate said controlling device, one of said rods being connected with said valve.

EDWARD W. COMFORT.

Witnesses:
HENRY J. MILLER,
ESTHER C. MURPHY.